May 17, 1927.
M. GOLDMAN ET AL
1,629,380
SIGNALING DEVICE
Filed July 6, 1925
2 Sheets-Sheet 1
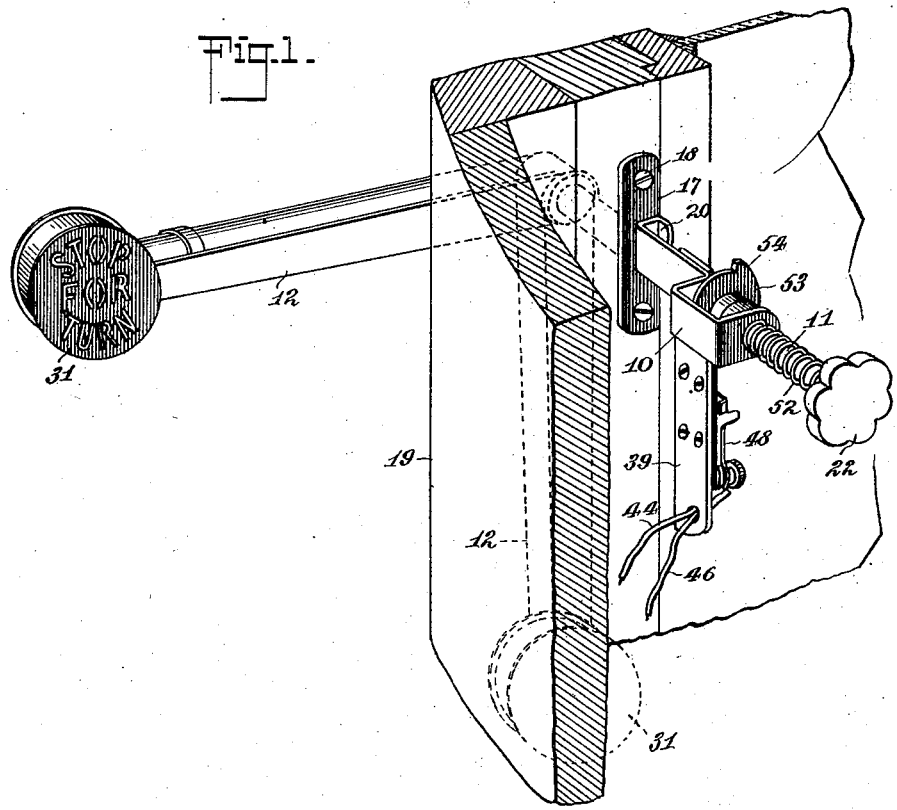
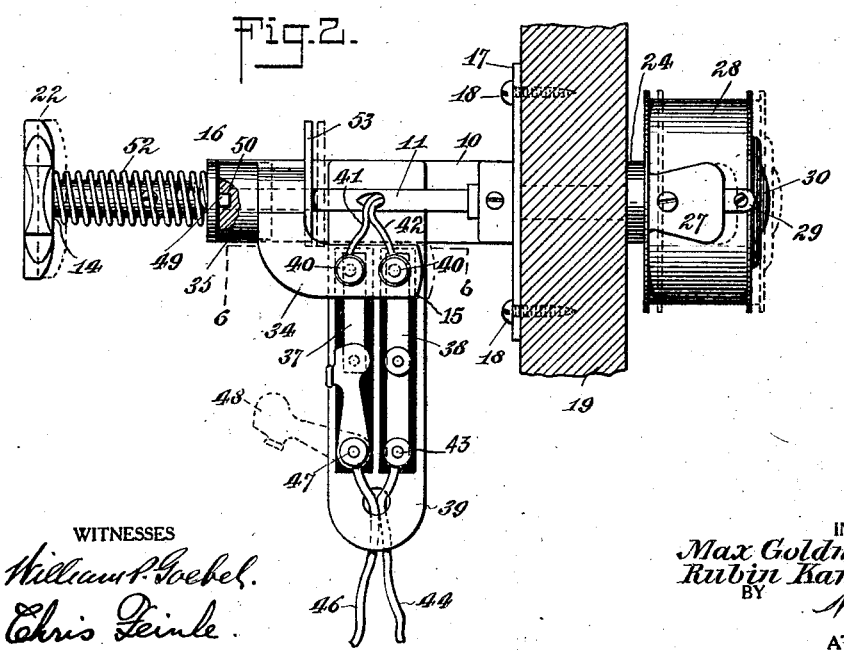
WITNESSES
INVENTOR
Max Goldman
Rubin Karaban
BY
ATTORNEYS May 17, 1927.  M. GOLDMAN ET AL  1,629,380
SIGNALING DEVICE
Filed July 6, 1925    2 Sheets-Sheet 2
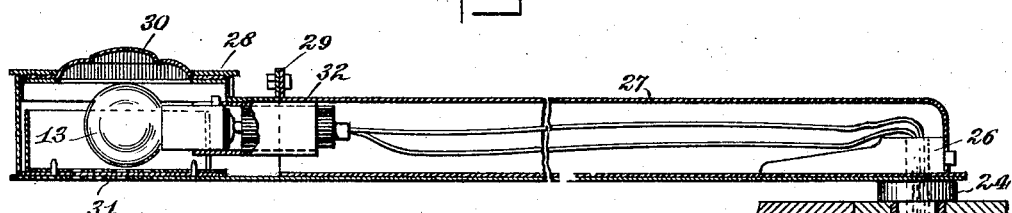
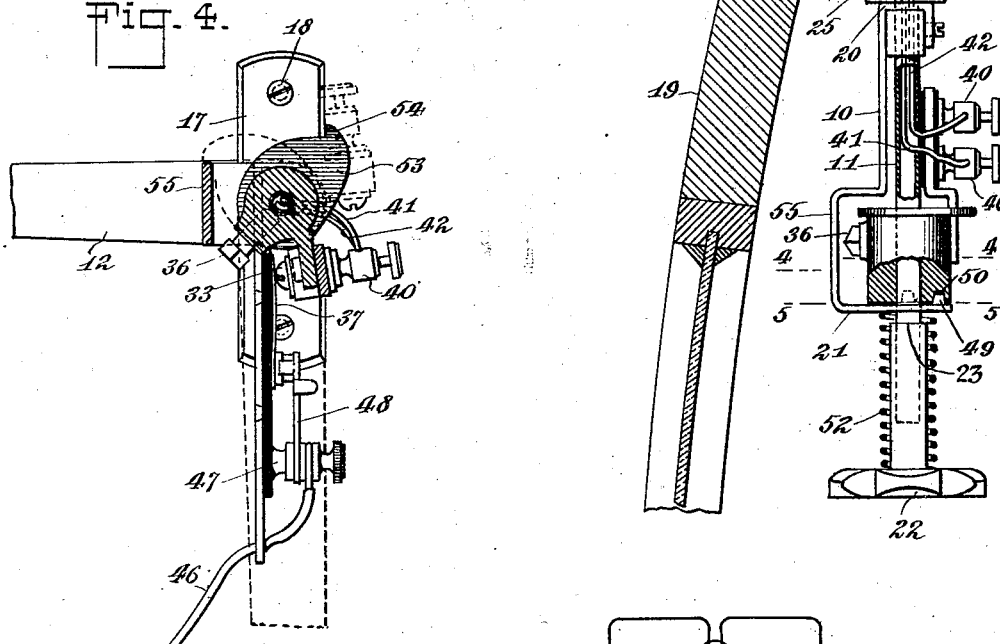
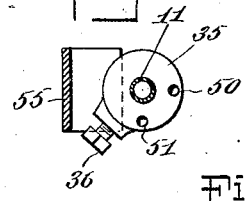
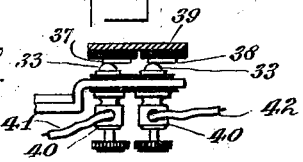
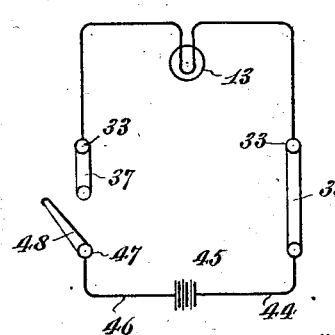
INVENTOR
Max Goldman
Rubin Karaban
BY
ATTORNEYS Patented May 17, 1927.

1,629,380

UNITED STATES PATENT OFFICE.

MAX GOLDMAN AND RUBIN KARABAN, OF BROOKLYN, NEW YORK.

SIGNALING DEVICE.

Application filed July 6, 1925. Serial No. 41,828.

This invention relates to signaling devices of the class which are employed upon vehicles, such as automobiles for signaling the operators of trailing vehicles or conveyances.

The present invention contemplates the provision of suitable means in the form of an arm which constitutes a signal in the daytime and which is movable to signaling and non-signaling positions, and means carried by said arm which is capable of being rendered active to be visual as a signal in the nighttime when the arm is moved to a signaling position and which is rendered inactive when the arm is moved to a non-signaling position. The present invention further contemplates the provision of means for holding the said arm in the signaling and non-signaling positions so that the operator of the vehicle will have the use of both hands and will not be required to hold the arm in a signaling position.

With the foregoing and other objects in view, the invention resides in the particular provision, relative disposition, and operation of the parts hereinafter fully described and illustrated in the accompanying drawings in which Figure 1 is a perspective view of the device of the present invention shown applied to a portion of the front compartment of an automobile body; and the signal arm being moved to a signaling position.

Fig. 2 is a side elevation.

Fig. 3 is a sectional elevation looking down on the device with the signal arm in signaling position.

Fig. 4 is a detail sectional view taken on the line 4—4 of Fig. 3.

Fig. 5 is a detail sectional view taken on the line 5—5 of Fig. 3.

Fig. 6 is a detail view showing parts of the circuit make-and-break.

Fig. 7 is a diagrammatic view of the electric circuit and connected elements.

Generally stated, the present invention comprises a mounting 10, shaft 11 which is supported by said mounting for longitudinal and turning movement, a signal arm 12 secured to one end of said shaft, a signal lamp 13 carried by said arm, arm operating means 14, signal operating means 15 which is operable upon the operation of the arm operating means 14, and holding means 16 for holding the arm 12 in a signaling position and a non-signaling position.

More specifically, and in the present embodiment, the above mentioned appurtenances are arranged, constructed and operate in a manner presently to be described. The mounting 10 is in the nature of a bracket which includes a plate 17 which serves for the attachment of the mounting in addition to the use of suitable fastening elements 18, the mounting being attached to a front portion of the front compartment 19 of an automobile body. The mounting 10 is formed to provide bearing portions 20 and 21 through the holes in which the shaft 11 extends. The shaft is mounted so as to have turning movement and also to have longitudinal movement. One end of the shaft has a manipulator 22 and is reduced to provide a shoulder 23, and the opposite end has a collar 24 secured thereto. The shoulder 23 limits the longitudinal movement of the shaft 11 in one direction when said shoulder contacts the portion 21, whereas, the collar 24 limits the longitudinal movement of the shaft 11 in an opposite direction when disposed in contact with the adjacent end of the bushing 25 in the front portion of the compartment 19. The arm 12 is of hollow construction and is secured to the outer end of the shaft 11 by virtue of the use of a member 26 attached to the shaft and to which a portion of the arm casing is attached. The arm casing consists of two sections, a section 27 and a section 28 which is detachably secured to the section 27 as at 29. The section 28 includes a lens 30, and a sign plate or means 31. The light rays of the signal 13 which is in the form of an electric lamp are emitted through the lens 30 and the sign plate 31. The section 28 carries an electrical socket 32 which electrically receives the electric lamp signal 13. The signal operating means 15 includes contacts 33 carried by and insulated from a member 34 attached to a member 35 mounted on the shaft 11 and held in place thereon by a set screw 36. The means 15 also includes contact plates 37 and 38 which are carried by and insulated from a member 39 attached to a portion of the mounting 10. The member 34 carries binding posts 40 which are electrically connected respectively to the contacts 33. A conductor 41 leads from one binding post 40 through the hollow portion of the shaft 11 to one electrode of the socket 32 and a conductor 42 leads from the other electrode of the socket 32 through the hollow portion of the shaft 11 to the other binding post 40. A binding post 43 carried by the contact plate 38 has connected thereto one end of a conductor 44 which has the opposite end electrically connected to the positive pole of the battery 45. The negative pole of the battery is connected by a conductor 46 to the pivot 47 on which is pivotally mounted a switch lever 48 adapted to be moved into and out of engagement with a portion of the contact plate 37 to establish and disestablish a circuit.

The holding means 16 consists of a lug or pin 49 on the portion 21 of the mounting 10 and holes 50 and 51 each of which is adapted to receive the pin 49, and a spring 52 which surrounds a portion of the shaft 11 with one end against the manipulator 22 and the opposite end thereof against the portion 21. The spring has a normal tendency to hold the shaft 11 in a position in which the collar 24 will abut the bushing 25 to thus limit the longitudinal movement of the shaft in one direction. By pushing on the manipulator 22 the shaft 11 will be moved longitudinally against the action of the spring 52, and by imparting a turning movement to the manipulator 22 the shaft 11 may be turned to bring the arm 12 in a horizontal position, which is the signaling position. When the arm is moved to the signaling position the hole 50 will be brought into registration with the pin 49, then by releasing the pushing force on the manipulator 22 the member 35 will be moved toward the portion 21 and as a result the pin 49 will enter the hole 50. The arm 12 will then be held in a horizontal position. In a similar manner, except that the shaft be turned in a reverse direction, the arm 12 may be brought to a vertical position, which is the non-signaling position. When the arm is moved to the vertical position, the pin 49 will be disposed in the hole 51. A member 53 attached to the member 35 has a portion 54 which engages a portion 55 of the mounting 10 and limits the turning movement of the shaft 11 in a counter-clockwise direction and insures the registration of the hole 51 with the pin 49. It will be apparent from the foregoing that when the arm 12 is moved to a signaling position the contacts 33 will be brought into contact with the plates 37 and 38 respectively to close the circuit through the signal lamp 13. Therefore, when the arm 12 is in a signaling position the signal lamp 13 will be lighted. When the arm 12 is moved to a non-signaling position the contacts 33 will be moved away from the plates 37 and 38 and as a result the circuit will be broken and the lamp will be out.

We claim:

1. A signaling device including a mounting adapted to be fixed, a signal arm movably supported by said mounting, means for moving said arm, said means including a shaft mounted for turning and longitudinal movement on which said arm is mounted, a manipulator for effecting the turning and longitudinal movement of said shaft, holding means for holding the shaft against turning when brought to the signaling and non-signaling positions, said holding means comprising a member having spaced holes therein secured to said shaft, a relatively fixed pin adapted to be entered into either of said holes by virtue of turning and longitudinal movement imparted to said shaft, and a spring serving to releasably maintain said pin in either of said holes.

2. A signaling device including a mounting adapted to be fixed, a signal arm movably supported by said mounting, means for moving said arm, said means including a shaft mounted for turning and longitudinal movement on which said arm is mounted, a manipulator for effecting the turning and longitudinal movement of said shaft, holding means for holding the shaft against turning when brought to the signaling and non-signaling positions, said holding means comprising a member having spaced holes therein secured to said shaft, a relatively fixed pin adapted to be entered into either of said holes by virtue of turning and longitudinal movement imparted to said shaft, a spring serving to releasably maintain said pin in either of said holes; and means for limiting the longitudinal movement of said shaft in opposite directions.

MAX GOLDMAN.
RUBIN KARABAN.